United States Patent [19]

Coles

[11] 4,295,653
[45] Oct. 20, 1981

[54] PRESSURE-COMPENSATED DIAPHRAGM SEALS FOR ACTUATORS, WITH SELF-EQUALIZATION

[75] Inventor: Carl R. Coles, Michigan City, Ind.

[73] Assignee: Zero-Seal, Inc., Arlington Heights, Ill.

[21] Appl. No.: 138,199

[22] Filed: Apr. 7, 1980

[51] Int. Cl.³ .......................... F04B 21/00; F16J 15/50
[52] U.S. Cl. ................................. 277/2; 277/212 FB; 74/18.2
[58] Field of Search .............. 277/2, 212 FB; 74/18.1, 74/18.2

[56] References Cited

U.S. PATENT DOCUMENTS

| | | | |
|---|---|---|---|
| 2,731,282 | 1/1956 | McManus et al. | 277/2 |
| 3,620,652 | 11/1971 | Jaspers et al. | 74/18.2 |
| 3,815,925 | 6/1974 | Mattoon | 277/2 |
| 3,933,052 | 1/1976 | Coles | 74/18.1 |

Primary Examiner—Robert I. Smith
Attorney, Agent, or Firm—Howard H. Darbo

[57] ABSTRACT

The invention has especial utility for providing completely safe hermetic sealing of actuators extending into highly sensitive or isolative process equipment, such as that using atomic radiation. The invention uses a general principle taught by the inventor's prior U.S. Pat. No. 3,933,052. The actuator is hermetically sealed by the aid of a flexible diaphragm, and the diaphragm is made safe by pressure compensation. A sealing liquid confined on the outside of the hermetic diaphragm applies the same pressure to the outside face of the diaphragm as is applied by the process atmosphere to the inside face of the diaphragm. According to the embodiment illustrated in that patent, a diaphragm (actually a bellows) entirely separate from the actuator was exposed to the process atmosphere to apply its pressure to the sealing liquid. According to the present invention, a diaphragm which accommodates the movement of the actuator and accomplishes the hermetic sealing also transmits the pressure of the process atmosphere to the sealing liquid. The present invention also has some features of "fail-safe" nature and achieves other simplification. Also, it provides a temporary seal that permits servicing of the outer packing around the actuator.

12 Claims, 4 Drawing Figures

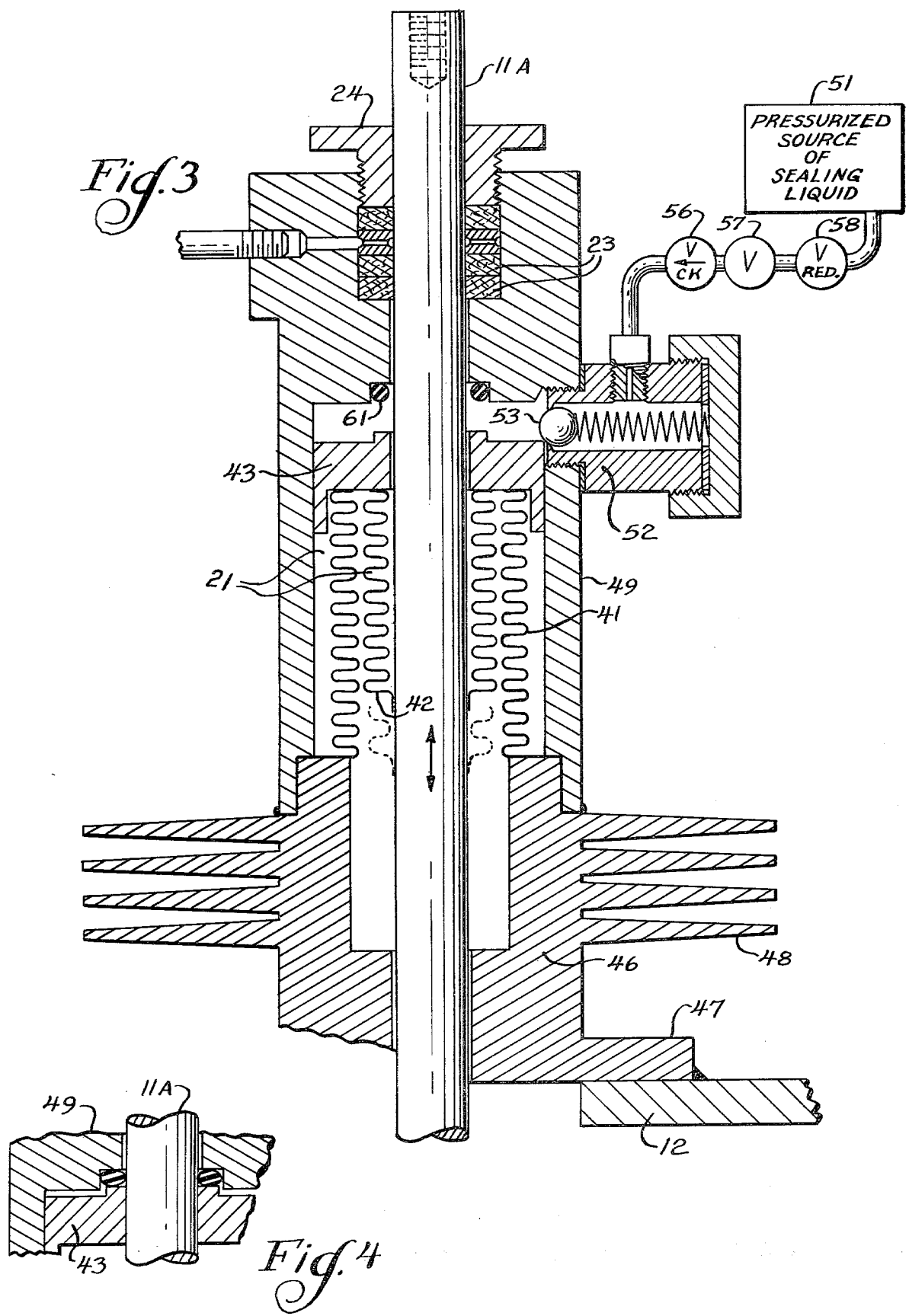

PRESSURE-COMPENSATED DIAPHRAGM SEALS FOR ACTUATORS, WITH SELF-EQUALIZATION

INTRODUCTION

The invention of which the present disclosure is offered for public dissemination if adequate patent protection is available relates to the field of providing safe hermetic seals for actuators by which something inside of a highly isolative process apparatus may be actuated from the outside. the term "highly isolative" is used here with respect to apparatus from which nothing must be permitted to escape, an example being a nuclear reactor.

The essential principles of safe sealing used in this invention were taught by the applicant's prior U.S. Pat. No. 3,933,052. Hermetic sealing of the actuator was accomplished by use of a diaphragm, actually a bellows, which permitted necessary movement of a part of the actuator while providing a hermetic seal between it and the highly isolative apparatus. Such hermetic sealing by a diaphragm was old, but according to the underlying principle of that patent, it is given a previously unattained safety by confining a sealing liquid on the outside of the diaphragm and using it to apply to the outer face of the diaphragm a compensating pressure exactly equal to the pressure applied to the inner face by the highly isolative apparatus.

As is often the case, the structure worked out for initially embodying this principle was relatively complex. For example, it included three additional diaphragms or bellows besides the one forming the main hermetic seal. According to the present invention, a simplified diaphragm system is provided in which the equalized compensating pressure results from the fact that the diaphragm system can accommodate itself positionally to the volume of the confined sealing liquid which is therefore placed under this compensating pressure by the diaphragm system.

The sealing liquid must ordinarily be confined behind the hermetic diaphragm by a non-hermetic seal such as one using packing rings or a rotary seal for the actuating shaft where it passes through the seal housing to the external atmosphere. According to the prior patent, the minute seepage of sealing liquid through such an outer seal caused no great difficulty because this sealing liquid could be replenished as needed through a separate valved replenishment port. Of course, if the packing gland deteriorates to the point of leaking badly, constant replenishment would become a problem. According to the present invention, it is possible to replace the packing gland without loss of the compensating pressure on the sealing liquid. This is accomplished by letting the diaphragm system extend, as the sealing liquid is lost through the outer seal, to a terminal position at which it creates a temporary seal between the outer seal and the confined sealing liquid. This temporary seal may serve both for maintaining the sealing liquid confined so that it can exert the compensating pressure on the diaphragm and also to permit removal of the packing gland and its replacement.

The present invention also incorporates a fail-safe feature. There will be no disaster if there should be a failure to replenish the sealing liquid when some or much of it has leaked out through the packing. Instead, the diaphragm system, as it expands to occupy the space left by the leaking sealing liquid, comes to a safe terminal point. In one form, at this point the diaphragm is structurally restrained in a manner that prevents rupture of the diaphragm. In the other form a temporary seal is formed to prevent further loss of liquid. Under either condition it may not be possible, or may be difficult, to operate the control actuator. This seeming disadvantage is actually an advantage in that an operator who attempts to operate the actuator will realize that special servicing such as the supply of more sealing liquid is required.

Advantages of the invention will be more apparent from the following description, and from the drawings.

DESIGNATION OF FIGURES

FIG. 3 is a sectional view of another preferred form of the invention, taken approximately on an axial plane.

FIG. 4 is a fragmentary view similar to a portion of FIG. 3 but showing the terminal or fully extended position of the membrane system.

BACKGROUND DESCRIPTION

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
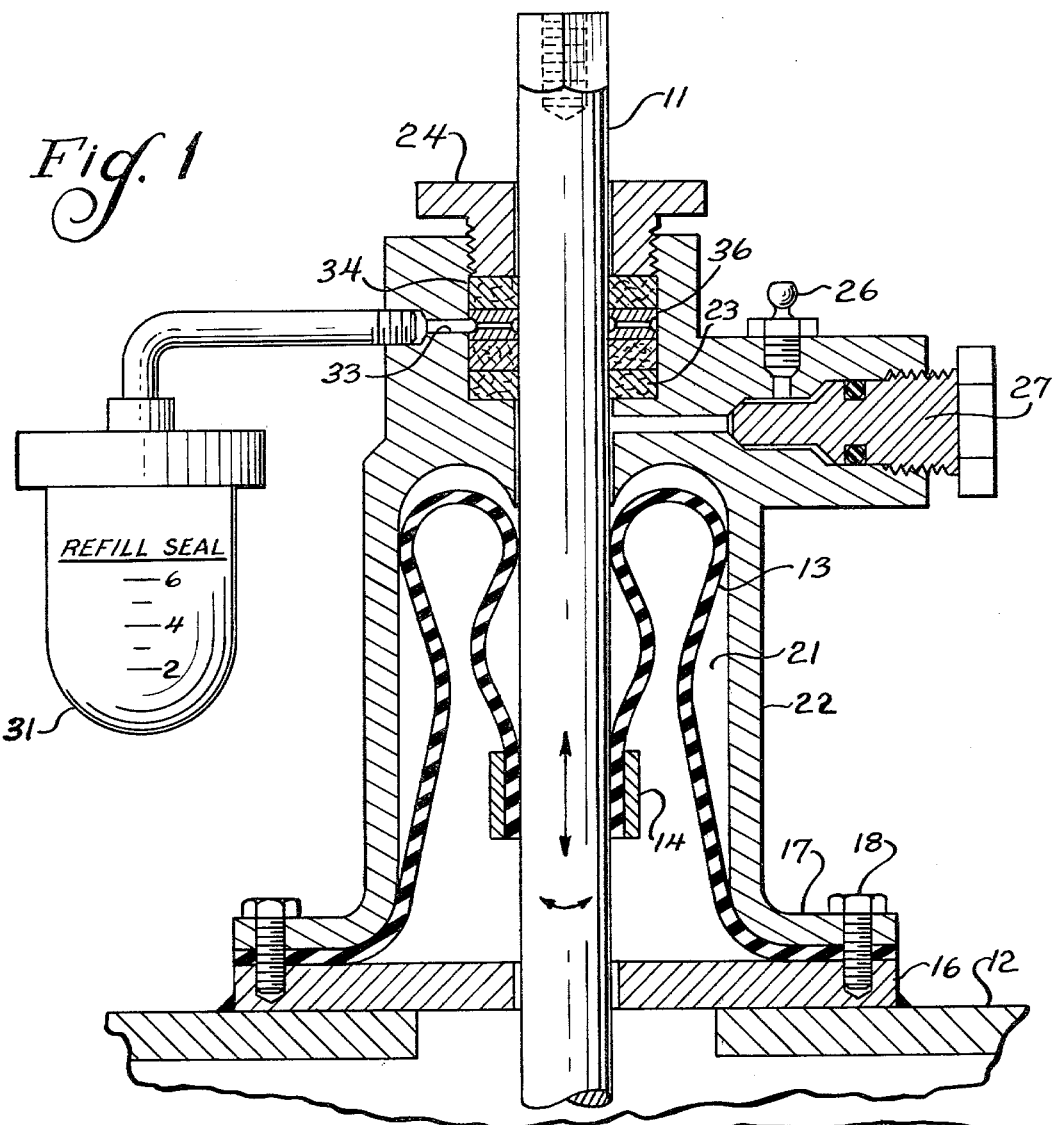
FIG. 1 is a sectional view, approximately along an axial plane, of one preferred form of the invention.

Both forms of the present invention are concerned with maintaining a reliable hermetic seal between a movable actuator shaft 11 and an isolative apparatus 12 within which a valve or other piece of equipment is to be actuated by the actuator 11. The apparatus 12 is isolative in the sense that some process takes place within it that must be kept isolated from the surrounding atmosphere. One example is a nuclear reactor within which radioactive particles are in the process atmosphere which must not be allowed to escape even in minute quantities. The present invention assumes that relatively limited movement of the actuator 11 is all that is required. In FIG. 1, both limited pivotal movement and limited longitudinal movement could be required, whereas in FIG. 3 it is assumed that limited longitudinal movement is enough.

DESCRIPTION OF THE ELASTOMERIC VERSION OF THE INVENTION

In FIG. 1, the main element of the hermetic seal is a diaphragm 13 made of an elastomeric material immune to or highly resistant to the process atmosphere. The material known as neoprene rubber is an example of an elastomer which would be suitable for the diaphragm for a great many process atmospheres.

It may be assumed that the diaphragm 13 is molded to a shape having approximately the cross section shown in FIG. 1, the shape being also described as generally tubular but doubled back. One end of the tubular structure is sealed to shaft 11 by a ferrule-like hose clamp 14 while the other outer end of the tubular diaphragm structure is sealed between base plate 16 and flange 17 with sufficient clamping force developed by the screws 18 to ensure a hermetic seal. Although the base plate may be secured to the isolative apparatus 12 in a variety of manners, peripheral welding has been illustrated because of its dependable nature as a hermetic seal.

It will be apparent that one face of the diaphragm 13 which may be called its inner face is exposed to the process atmosphere or working atmosphere of the isolative apparatus 12. According to the prior patent of the present inventor, the outer face of the diaphragm 13 is exposed to a sealing liquid which is confined adjacent to the diaphragm so that it can exert on the outer face of the diaphragm a pressure exactly or approximately equal to the pressure on the inner face of the diaphragm 13 so as to protect the diaphragm 13 from any rupturing differential force which would otherwise result from a high pressure on the inner face of the diaphragm. According to the present invention, the sealing liquid is confined with the space 21. Part of this space 21 is between the diaphragm 13 and housing 22 which is secured in place by its flange 17. The confined space 21 may also extend between the diaphragm 13 and actuator 11.

In order for the sealing liquid to be confined within the space 21, there must be an outer seal between the housing 22 and the shaft 11. It must be capable of withstanding pressure equal to the process atmosphere pressure. Because the shaft 11 must move with respect to the housing 22, practical considerations dictate the use of a packing seal 23 or other rubbing type of seal. The packing may be kept under necessary pressure by a packing gland or nut 24.

Some means should be provided for forcing the sealing liquid into the space 21. This has been illustrated as a conventional nipple 26 for a grease gun. Such nipples conventionally include a ball check valve so that grease can be forced into the space 21 under pressure but cannot flow out from this space through the fitting 26. A plug type of seal may be provided if greater dependability is required. The light grease such as is commonly used in grease guns is an ideal type of sealing liquid.

Figure 2:
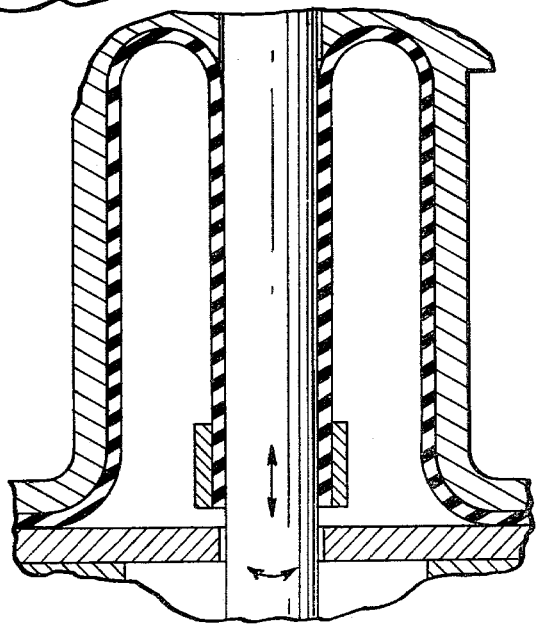
FIG. 2 is a fragmentary view similar to FIG. 1 but showing the diaphragm fully extended.

Some means should be provided for knowing when the supply of liquid sealant in space 21 should be replenished through the nipple 26 (unless replenishing is automatic). According to FIG. 1, the seepage of sealing liquid past the packing 23 is caught in a transparent jar 31 which may have thereon an indication of the level which, when reached by the escaped liquid within the jar 31, indicates the need for supplying replacement liquid through nipple 26. Alternatively, the jar 31 could be graduated, with markings indicating the number of strokes of the grease gun needed to replace the escaped liquid. Of course, it is desirable that the quantity of escaping liquid be as small as possible. Hence, two sealing rings 23 have been shown between the drain port 33 and space 21. To be sure that all escaping liquid is trapped in jar 31, a third sealing ring 34 may be provided on the outside of a drain ring 36. The gland 24 compresses all of the seal rings 23 and 34 so that they spread to engage the actuator 11 with suitable pressure for forming a seal without causing objectionable resistance to the movement of actuator 11. In the event of continuing leakage of sealing liquid from space 21 without replenishment through nipple 26, diaphragm 13 would eventually stretch to the position shown in FIG. 2. It will be observed that there is still no danger of rupture of the diaphragm 13 by pressure of the isolative or process atmosphere against the inner surface of diaphragm 13, because substantially the entire surface of diaphragm 13 is supported by either the inner surface of housing 22 or the surface of shaft or actuator 11. FIG. 2 illustrates a visible clearance between the actuator 11 and the housing 22, but this is exaggerated for the sake of illustration. There should be only enough clearance, if any, to ensure easy movement of the actuator 11. With such a small clearance, it is immaterial that the diaphragm will be unsupported in the very small area where this clearance is found. In fact, process pressure which might tend to burst the diaphragm 13 merely presses it firmly against both actuator 11 and the adjacent portion of housing 22 so as to form a temporary additional seal between the housing and the shaft. This permits replacing the packing rings 23, in the event that they have deteriorated to the point of permitting excessive leakage of the sealing liquid. Of course, to replace them the packing gland 24 is removed.

The surfaces supporting the diaphragm are smoothly contoured (free from corners) so that the diaphragm will not be subjected to excessive local stressing.

DESCRIPTION OF PAIRED BELLOWS VERSION

In some instances the elastomeric diaphragm of FIGS. 1 and 2 may be undesirable and the use of metal bellows may be preferred. If rotation or substantial pivoting of the actuator is required, a sealed drive such as that of the prior patent mentioned may be needed. However, if only longitudinal movement of the actuator is required a bellows system having considerable resemblance to the features of FIGS. 1 and 2 may be used, as shown in FIG. 3. Here, the shaft or actuator 11A is shown extending into an isolative apparatus 12. It might, however, extend merely to or toward the isolative apparatus, terminating at a point short of the apparatus where it could perform such a function as pressing a control button.

The hermetic seal in this instance is illustrated as a bellows system including an outer bellows 41, an inner bellows 42, and a piston 43 to which both of the bellows are hermetically attached as by brazing. The lower end of bellows 41 is hermetically attached to housing base 46 and the lower end of bellows 42 is hermetically attached to actuator 11A. Thus, the bellows system forms a hermetic seal between the housing base 46 and the actuator 11A. The housing base 46 is provided with a flange 47 which is hermetically attached, as by peripheral welding, to the isolative apparatus 12.

One of the reasons why an elastomeric diaphragm may be unsuitable is if the temperature of the isolative atmosphere might be too high for it. With such high temperatures in mind, the housing base 46 has been illustrated with cooling fins 48. If necessary, there could be further cooling as by circulating a cooling medium which, after absorbing heat from the seal structure would pass through a heat-dissipating radiator and return. The cooling medium could be the sealing liquid, being drawn from and returned to the confined sealant space 21 within the housing 49 and outside of the bellows system 41, 42 and 43. Of course, the circulating cooling system should, in this instance, be hermetically sealed and of a nature to be a branch of the confined space 21.

The piston 43, in FIG. 3, preferably has a free-sliding fit with housing 49, and either a free-sliding fit or a slight clearance around actuator 11A. It is thus able to accommodate itself to the quantity of sealing liquid confined within space 21, much of which will usually be above piston 43. The piston 43 will therefore transmit to the sealing liquid the pressure of the isolative atmosphere, so that the sealing liquid located externally of the bellows 41 and 42 will have the same pressure, or substantially the same, as the isolative atmosphere. Thus, there will be the compensation described in the prior patent so that the pressure of the internal atmosphere will have no tendency to rupture the bellows.

FIG. 3 illustrates diagrammatically a system for maintaining within the space 21 an ideal quantity of sealing liquid. This is accomplished by automatically replenishing the liquid to whatever extent leakage occurs past packing rings 23. This automatic replenishing system may be considered diagrammatic inasmuch as its details will be largely a matter of choice by a particular designer. It should have a constantly pressurized source 51 for the sealing liquid. The pressure should be a little higher than any to be encountered in the isolative atmosphere. If only moderate pressures will be in the isolative atmosphere, the source could be gravitational, such as a raised tank of the liquid. If very high pressures are to be encountered in the isolative atmosphere, the source could be a closed tank of the sealing liquid with gas applied above it in the tank from a gas cylinder to maintain it under a predetermined pressure.

The pressurized source 51 should supply its sealing liquid through a valve 52 biased to the closed position but pressed open when piston 43 engages the tip of valve ball 53. This will press the valve ball 53 out of engagement with its seat so that the pressurized source can force sealing liquid into space 13, moving piston 43 downwardly (retracting it) until it allows valve ball 53 to seat and shut off the flow of sealing liquid.

In FIG. 3, the conduit between the pressurized source and valve 52 has been illustrated as including a check valve 56, an on-off valve 57 and a reducing valve 58. The check valve 56 prevents any loss of pressure on the sealing liquid in space 13 in the event of failure of the supply system. The on-off valve 57 will be closed when it is desired to change the packing rings 23, as will be described. The reducing valve 58 may not be needed unless the pressure of the pressurized source would otherwise be much higher than the maximum expected pressure of the isolative atmosphere. If a cylinder of pressurized or liquified gas is the source of the pressure, this reducing valve would be in a different position, where it controls the gas pressure.

With automatic replenishing system illustrated in FIG. 3, the leakage-trapping jar 31 is less needed than in FIG. 1, but it may be provided anyway as a matter of cleanliness and so that need for replacing packing rings 23 can be detected. In the event of the excessive leakage of these packing rings, the valve 57 will be closed so that the leakage will allow piston 43 to move upwardly until it squeezes O-ring 61 to form a temporary seal between housing 49 and actuator 11A as seen in FIG. 4. With this temporary seal, the nut or gland 24 may be removed to permit replacement of the packing rings 23. The attendant's practice will probably be to loosen gland 24 as soon as he has closed valve 57, so that the sealing liquid will quickly leak through packing rings 23 until O-ring 61 has been sufficiently distorted to effectuate its temporary seal. When the leakage stops, the attendant will remove gland 24 and replace the packing rings 23. He will then reopen valve 57 which will supply enough replacement sealing liquid to thrust the piston 43 downwardly (retracting it) until it allows valve ball 53 to seat and shut off the replacement flow of sealing liquid.

As the piston 43 is moved away from O-ring 61, the O-ring would return to its normal position in which it is out of contact with actuator 11A so as not to be worn or flattened by the movements of this actuator. It can hold itself in place by resilient engagement of its outer peripheral surface with housing 49. Also, housing 49 could be provided with a lip extending slightly under the greatest diameter of O-ring 61 to ensure its retention.

Although anyone desiring to use this invention will probably do his own engineering, some effort has been made to illustrate the invention in practical form. It is assumed that much of the assembly will be performed before the housing 22 or 49 is applied. Access to clamping ring 14 may then be achieved by raising the outer portion of diaphragm 13. Likewise, access to brazing the lower end of bellows 42 to actuate 11A can be achieved by upwardly compressing the bellows 41.

ACHIEVEMENT

From the foregoing, it is seen that an improved and simplified device using the principles of this applicant's prior U.S. Pat. No. 3,933,052 has been provided. In this instance, the same membrane which forms the flexible hermetic seal between the transmission means or actuator and the seal housing transmits to the compensating sealing liquid on the exterior of the membrane the pressure of the working atmosphere. This is accomplished by having a portion of the membrane accommodate itself in its position to the quantity of confined sealing liquid. This, in turn, requires an excess of the diaphragm material so that a portion of it can move independently of the actuator.

In addition the improved pressure-compensated sealed transmission device of the present invention has "fail-safe" characteristics. If the outer seal for the transmission means should fail, or if the attendant fails to replenish sealing liquid which has slowly seeped through this outer seal, the membrane still will not be subjected to a rupturing danger resulting from a high differential between the internal and external pressures, because the membrane must stretch to a point at which it is fully protected. It may be that the transmission means may no longer work easily but that fact will warn the attendant that the device needs replenishment of the liquid. Indeed, the ideal would be to incorporate some automatic locking device which prevents operation of the transmission means while it is stretched to the limit.

In its preferred forms, the present invention also forms a temporary seal between the confined sealing liquid and the outer seal, when the limit in stretching (or the terminal position) has been reached, so that the outer seal may be serviced, as by replacing it.

One preferred form of the invention includes automatic means for replacing the sealing liquid as needed. Stretching of the membrane to the terminal point, with the advantages previously mentioned, would thus only occur in the event of failure of the automatic replenishing device, or in the unlikely event that the outer seal failed so thoroughly as to let leakage exceed the supply furnished by the automatic replenishing device. A preferred form of the automatic replenishing device can be shut off, when servicing of the outer seal is desired, to permit the membrane to stretch to its terminal point and produce the temporary seal mentioned.

I claim:

1. A sealed transmission device for use in conjunction with apparatus having a working environment therein to be sealed reliably from the external environment and expected to exhibit substantial pressure and within which a function is to be performed by the transmission device; said transmission device including:
   a. a seal housing for sealed communication with the working environment and having an opening exposed to the external environment;
   b. a movement transmission means extending movably through said opening;
   c. a pressure-withstanding seepage-prone seal normally preventing substantial leakage through said opening while permitting movement of the transmission means, and subject to possible leakage-causing impairment by such movement;
   d. an impervious flexible membrane, cooperating with said housing and said transmission means to allow said transmission means to perform a function in the working environment, and to form a hermetic seal between the working environment and said opening and to form a confined space for a sealing liquid between said opening and said membrane; the housing characteristics being such that the volume of the confined space is substantially constant except for movement of the membrane;

said membrane having a portion free to move, extensively and independently of movement of the transmission means, under influence of pressure of the working environment to accommodate itself to the volume of the confined sealing liquid to maintain that liquid at a pressure on the outer face of the membrane substantially equal to the pressure exerted on the inner face by the working environment;

said device including means effective, in the event of failure of said pressure-withstanding seal, to limit the yielding of the membrane to a safe amount and maintaining a protective pressure on the outer face of the membrane, and at the same time to form a temporary seal between the confined space and the opening permitting the servicing of said pressure-withstanding seal.

2. A sealed transmission device for use in conjunction with apparatus having a working environment therein to be sealed reliably from the external environment and expected to exhibit substantial pressure and within which a function is to be performed by the transmission device; said transmission device including:
   a. a seal housing for sealed communication with the working environment and having an opening exposed to the external environment;
   b. a movement transmission means extending movably through said opening;
   c. a pressure-withstanding seepage-prone seal normally preventing substantial leakage through said opening while permitting movement of the transmission means, and subject to possible leakage-causing impairment by such movement;
   d. an impervious flexible membrane, cooperating with said housing and said transmission means to allow said transmission means to perform a function in the working environment, and to form a hermetic seal between the working environment and said opening and to form a confined space for a sealing liquid between said opening and said membrane; the housing characteristics being such that the volume of the confined space is substantially constant except for movement of the membrane;

said membrane having a portion free to move, extensively and independently of movement of the transmission means, under influence of pressure of the working environment to accommodate itself to the volume of the confined sealing liquid to maintain that liquid at a pressure on the outer face of the membrane substantially equal to the pressure exerted on the inner face by the working environment;

said device including means effective, in the event of failure of said pressure-withstanding seal, to limit the yielding of the membrane to a safe amount and maintaining a protective pressure on the outer face of the membrane, and at the same time to form a temporary seal between the confined space and the opening permitting the servicing of said pressure-withstanding seal;

said membrane comprising an elastomeric diaphragm of tubular, doubled-back nature adapted to stretch, as loss of sealing liquid permits, into contact substantially throughout its outer surface with rigid supporting structure, said structure providing a smoothly contoured surface for minimizing localized stresses in the diaphragm.

3. A sealed transmission device for use in conjunction with apparatus having a working environment therein to be sealed reliably from the external environment and expected to exhibit substantial pressure and within which a function is to be performed by the transmission device; said transmission device including:
   a. a seal housing for sealed communication with the working environment and having an opening exposed to the external environment;
   b. a movement transmission means extending movably through said opening;
   c. a pressure-withstanding seepage-prone seal normally preventing substantial leakage through said opening while permitting movement of the transmission means, and subject to possible leakage-causing impairment by such movement;
   d. an impervious flexible membrane, cooperating with said housing and said transmission means to allow said transmission means to perform a function in the working environment, and to form a hermetic seal between the working environment and said opening and to form a confined space for a sealing liquid between said opening and said membrane;

said membrane having a portion free to move, extensively and independently of movement of the transmission means, under influence of pressure of the working environment to accommodate itself to the volume of the confined sealing liquid to maintain that liquid at a pressure on the outer face of the membrane substantially equal to the pressure exerted on the inner face by the working environment;

said device including means effective, in the event of failure of said pressure-withstanding seal, to limit the yielding of the membrane to a safe amount and maintaining a protective pressure on the outer face of the membrane, and at the same time to form a temporary seal between the confined space and the opening permitting the servicing of said pressure-withstanding seal;

said membrane including a pair of concentric bellows providing a common freely-movable end surrounding the transmission means within the housing and adapted to stretch, as loss of sealing liquid permits, to effectuate said temporary seal;

and automatic replenishing means activated by less stretching of said pair of bellows to admit additional pressurized liquid to said confined space until deactivated by retraction of said pair of bellows.

4. A sealed transmission device for use in conjunction with apparatus having a working environment therein to be sealed reliably from the external environment and expected to exhibit substantial pressure and within which a function is to be performed by the transmission device; said transmission device including:
 a. a seal housing for sealed communcation with the working environment and having an opening exposed to the external environment;
 b. a movement transmission means extending movably through said opening;
 c. a pressure-withstanding seepage-prone seal normally preventing substantial leakage through said opening while permitting movement of the transmission means, and subject to possible leakage-causing impairment by such movement;
 d. an impervious flexible membrane, cooperating with said housing and said transmission means to allow said transmission means to perform a function in the working environment, and to form a hermetic seal between the working environment and said opening and to form a confined space for a sealing liquid between said opening and said membrane;
 said membrane having a portion free to move, extensively and independently of movement of the transmission means, under influence of pressure of the working environment to accommodate itself to the volume of the confined sealing liquid to maintain that liquid at a pressure on the outer face of the membrane substantially equal to the pressure exerted on the inner face by the working environment;
 said device including means effective, in the event of failure of said pressure-withstanding seal, to limit the yielding of the membrane to a safe amount and maintaining a protective pressure on the outer face of the membrane.

5. A sealed transmission device for use in conjunction with apparatus having a working environment therein to be sealed reliably from the external environment and expected to exhibit substantial pressure and within which a function is to be performed by the transmission device; said transmission device including:
 a. a seal housing for sealed communication with the working environment and having an opening exposed to the external environment;
 b. a movement transmission means extending movably through said opening;
 c. a pressure-withstanding seepage-prone seal normally preventing substantial leakage through said opening while permitting movement of the transmission means, and subject to possible leakage-causing impairment by such movement;
 d. an impervious flexible membrane, cooperating with said housing and said transmission means to allow said transmission means to perform a function in the working environment, and to form a hermetic seal between the working environment and said opening and to form a confined space for a sealing liquid between said opening and said membrane;
 said membrane having a portion free to move, extensively and independently of movement of the transmission means, under influence of pressure of the working environment to accommodate itself to the volume of the confined sealing liquid to maintain that liquid at a pressure on the outer face of the membrane substantially equal to the pressure exerted on the inner face by the working environment;
 said device including means effective, in the event of failure of said pressure-withstanding seal, to limit the yielding of the membrane to a safe amount and maintaining a protective pressure on the outer face of the membrane;
 said membrane comprising an elastomeric diaphragm of tubular, doubled-back nature adapted to stretch, as loss of sealing liquid permits, into contact substantially throughout its outer surface with rigid supporting structure, said structure providing a smoothly contoured surface for minimizing localized stresses in the diaphragm.

6. A sealed transmission device for use in conjunction with apparatus having a working environment therein to be sealed reliably from the external environment and expected to exhibit substantial pressure and within which a function is to be performed by the transmission device; said transmission device including:
 a. a seal housing for sealed communication with the working environment and having an opening exposed to the external environment;
 b. a movement transmission means extending movably through said opening;
 c. a pressure-withstanding seepage-prone seal normally preventing substantial leakage through said opening while permitting movement of the transmission means, and subject to possible leakage-causing impairment by such movement;
 d. an impervious flexible membrane, cooperating with said housing and said transmission means to allow said transmission means to perform a function in the working environment, and to form a hermetic seal between the working environment and said opening and to form a confined space for a sealing liquid between said opening and said membrane;
 said membrane having a portion free to move, extensively and independently of movement of the transmission means, under influence of pressure of the working environment to accommodate itself to the volume of the confined sealing liquid to maintain that liquid at a pressure on the outer face of the membrane substantially equal to the pressure exerted on the inner face by the working environment;
 said device including means effective, in the event of failure of said pressure-withstanding seal, to limit the yielding of the membrane to a safe amount and maintaining a protective pressure on the outer face of the membrane;
 said membrane including a pair of concentric bellows providing a common freely-movable end surrounding the transmission means within the housing and adapted to stretch, as loss of sealing liquid permits.

7. A sealed transmission device for use in conjunction with apparatus having a working environment therein to be sealed reliably from the external environment and expected to exhibit substantial pressure and within which a function is to be performed by the transmission device; said transmission device including:
   a. a seal housing for sealed communication with the working environment and having an opening exposed to the external environment;
   b. a movement transmission means extending movably through said opening;
   c. a pressure-withstanding seepage-prone seal normally preventing substantial leakage through said opening while permitting movement of the transmission means, and subject to possible leakage-causing impairment by such movement;
   d. an impervious flexible membrane, cooperating with said housing and said transmission means to allow said transmission means to perform a function in the working environment, and to form a hermetic seal between the working environment and said opening and to form a confined space for a sealing liquid between said opening and said membrane;

said membrane having a portion free to move, extensively and independently of movement of the transmission means, under influence of pressure of the working environment to accommodate itself to the volume of the confined sealing liquid to maintain that liquid at a pressure on the outer face of the membrane substantially equal to the pressure exerted on the inner face by the working environment;

said device including means effective, in the event of failure of said pressure-withstanding seal, to limit the yielding of the membrane to a safe amount and maintaining a protective pressure on the outer face of the membrane;

said membrane including a pair of concentric bellows providing a common freely-movable end surrounding the transmission means within the housing and adapted to stretch, as loss of sealing liquid permits;

and automatic replenishing means activated by stretching of said pair of bellows to admit additional pressurized liquid to said confined space until deactivated by retraction of said pair of bellows.

8. A sealed transmission device according to claim 1, 2 or 3 including means for replenishing the supply of sealing liquid in the confined space to maintain a proper quantity therein.

9. A sealed transmission device according to claim 1, 2 or 3 including means for measuring the amount of seepage of liquid from the confined space through the seepage-prone seal.

10. A sealed transmission device according to claim 1, 2 or 3 including means for measuring the amount of seepage of liquid from the confined space through the seepage-prone seal and means for replenishing the supply of liquid in the confined space characterized by having available an aspect of manual control.

11. A sealed transmission device according to claim 1, 2 or 3 including means for directly measuring the amount of sealing liquid which has seeped from the confined space through the seepage-prone seal.

12. A sealed transmission device according to claim 1, 2 or 3 including means for directly measuring the amount of sealing liquid which has seeped from the confined space through the seepage-prone seal; and means for replenishing the supply of sealing liquid in the confined space to restore a proper quantity therein independently of influence on the confined space by the working environment.

* * * * *